(12) United States Patent
Hu et al.

(10) Patent No.: US 10,939,226 B2
(45) Date of Patent: *Mar. 2, 2021

(54) DYNAMIC IN-BAND SERVICE CONTROL MECHANISM IN MOBILE NETWORK

(71) Applicant: AT&T Intellectual Property I, L.P., Atlanta, GA (US)

(72) Inventors: Qingmin Hu, Sammamish, WA (US); Gus Bourg, Renton, WA (US); Terry Figurelle, Redmond, WA (US); Jie McKnight, Medina, WA (US); Jeffrey Dean Hjort, Fall City, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,928

(22) Filed: May 13, 2019

(65) Prior Publication Data
US 2019/0268448 A1   Aug. 29, 2019

Related U.S. Application Data

(63) Continuation of application No. 15/443,958, filed on Feb. 27, 2017, now Pat. No. 10,291,751, which is a continuation of application No. 14/984,947, filed on Dec. 30, 2015, now Pat. No. 9,584,636, which is a continuation of application No. 13/718,815, filed on Dec. 18, 2012, now Pat. No. 9,271,188.

(51) Int. Cl.
| | |
|---|---|
| *H04W 4/00* | (2018.01) |
| *H04W 4/18* | (2009.01) |
| *H04W 4/60* | (2018.01) |
| *H04W 12/06* | (2021.01) |
| *H04W 28/18* | (2009.01) |
| *H04L 29/06* | (2006.01) |
| *H04L 29/08* | (2006.01) |
| *H04W 72/04* | (2009.01) |
| *H04L 12/24* | (2006.01) |
| *H04W 88/16* | (2009.01) |

(52) U.S. Cl.
CPC ........... *H04W 4/00* (2013.01); *H04L 63/0823* (2013.01); *H04L 67/02* (2013.01); *H04L 69/22* (2013.01); *H04W 4/18* (2013.01); *H04W 4/60* (2018.02); *H04W 12/0609* (2019.01); *H04W 28/18* (2013.01); *H04W 72/0493* (2013.01); *H04L 41/00* (2013.01); *H04W 88/16* (2013.01)

(58) Field of Classification Search
USPC ................................................. 370/328, 468
See application file for complete search history.

(56) References Cited

U.S. PATENT DOCUMENTS

| | | | |
|---|---|---|---|
| 5,548,646 | A | 8/1996 | Aziz et al. |
| 5,623,495 | A | 4/1997 | Rune |
| 6,202,157 | B1 | 3/2001 | Brownlie et al. |
| 6,510,464 | B1 | 1/2003 | Grantges et al. |

(Continued)

*Primary Examiner* — Phuongchau Ba Nguyen

(57) ABSTRACT

A method, computer readable medium and apparatus for transmitting signaling information within payload traffic. The method parses a certificate received from a service provider to obtain service imprint information associated with a mobile service, inserts a service control parameter derived from the service imprint information into a packet header, and forwards the packet header within payload traffic to a policy charging and enforcing function.

20 Claims, 4 Drawing Sheets

(56) References Cited

U.S. PATENT DOCUMENTS

| | | |
|---|---|---|
| 7,509,489 B2 | 3/2009 | Kostal et al. |
| 7,649,849 B2 | 1/2010 | Mallya |
| 8,189,596 B2 | 5/2012 | Rasanen |
| 8,213,408 B1 | 7/2012 | Thomas et al. |
| 8,448,228 B2 | 5/2013 | Zhong et al. |
| 8,448,235 B2 | 5/2013 | Langham et al. |
| 8,528,259 B1 | 9/2013 | Labana |
| 8,670,333 B2 | 3/2014 | Miklos |
| 8,793,400 B2 | 7/2014 | McDysan |
| 9,137,739 B2 | 9/2015 | Raleigh |
| 9,775,166 B2 * | 9/2017 | Lu .................... H04W 72/1242 |
| 10,291,751 B2 * | 5/2019 | Hu ......................... H04W 4/18 |
| 2003/0069988 A1 | 4/2003 | Eng |
| 2003/0188039 A1 | 10/2003 | Liu et al. |
| 2006/0048228 A1 | 3/2006 | Takemori et al. |
| 2006/0090206 A1 | 4/2006 | Ladner et al. |
| 2006/0235973 A1 * | 10/2006 | McBride ................ H04L 67/20 709/226 |
| 2007/0033194 A1 | 2/2007 | Srinivas et al. |
| 2008/0028436 A1 | 1/2008 | Hannel |
| 2009/0037999 A1 | 2/2009 | Anderson et al. |
| 2011/0103372 A1 | 5/2011 | Shatsky |
| 2011/0270722 A1 * | 11/2011 | Cai .................... G06Q 30/0283 705/34 |
| 2011/0270985 A1 | 11/2011 | Um et al. |
| 2012/0158995 A1 * | 6/2012 | McNamee ............. H04L 45/24 709/238 |
| 2012/0271958 A1 * | 10/2012 | Oh ......................... H04L 12/14 709/228 |
| 2013/0170350 A1 | 7/2013 | Sarkar |

* cited by examiner

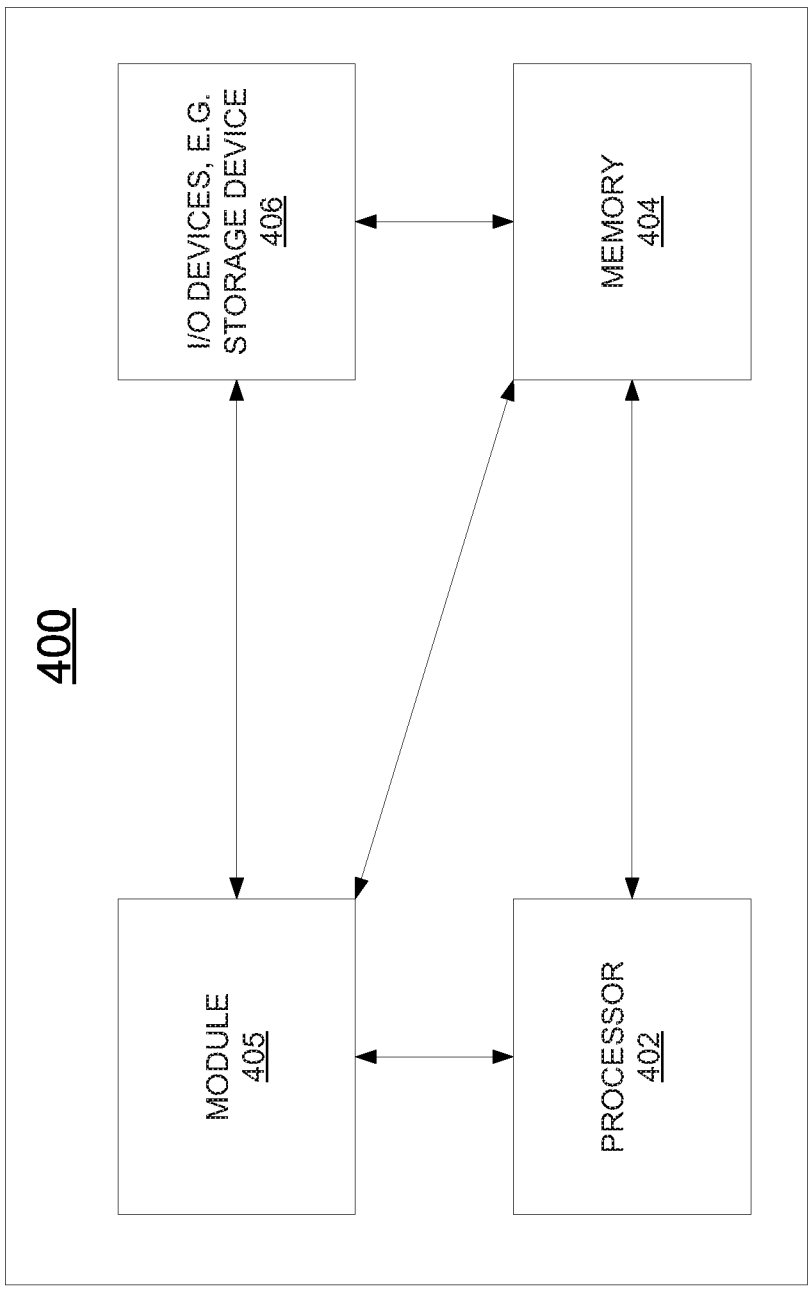

DYNAMIC IN-BAND SERVICE CONTROL MECHANISM IN MOBILE NETWORK

This application is a continuation of U.S. patent application Ser. No. 15/443,958, filed Feb. 27, 2017, now U.S. Pat. No. 10,291,751, which is a continuation of U.S. patent application Ser. No. 14/984,947, filed Dec. 30, 2015, now U.S. Pat. No. 9,584,636, which is a continuation of U.S. patent application Ser. No. 13/718,815, filed Dec. 18, 2012, now U.S. Pat. No. 9,271,188, all of which are herein incorporated by reference in their entirety.

The present disclosure relates generally to communication networks and, more particularly, to a method, computer readable medium and apparatus for providing a dynamic in-band service control mechanism in a mobile network, e.g., in a 3G network, a LTE (long term evolution) wireless network and the like.

BACKGROUND

With the introduction of LTE and wide availability of mobile broadband, there is significant growth in mobile services and applications. These new mobile services and applications pose huge challenges and opportunities to mobile operators in terms of providing network management (such as Quality of Service (QoS)) and control. Traditionally, mobile core network control is achieved by a policy control and charging (PCC) mechanism which is based on Internet Protocol (IP) flow at the network layer. However, most of the mobile services such as Web Real-Time Communication (WebRTC) need to be managed at the application level and these mobile services are mostly transactional and session based. In addition, the time sensitive nature of these transactional services requires a very low latency management solution. The traditional flow based service control does not manage the session based service well.

In addition, multiple ecosystems currently exist to support a diverse array of mobile applications. However, these ecosystems have poor or no interactions with each other. Given the dynamic nature of the mobile environment, it is difficult for these ecosystems to adapt to current conditions experienced by the mobile applications. This can lead to mobile applications not performing well when resources are not correctly allocated to meet the needs of the mobile application, particularly in real time, delay sensitive applications.

SUMMARY OF THE DISCLOSURE

In one embodiment, the present disclosure teaches a method, computer readable medium and apparatus for transmitting signaling information within payload traffic. In addition, the signaling information is transmitted within the user plane traffic flow instead of using out of band signaling as traditionally done. For example, the method parses a certificate received from a service provider to obtain service imprint information associated with a mobile service, inserts a service control parameter derived from the service imprint information into a packet header, and forwards the packet header within payload traffic to a policy charging and enforcing function.

BRIEF DESCRIPTION OF THE DRAWINGS

The teaching of the present disclosure can be readily understood by considering the following detailed description in conjunction with the accompanying drawings, in which:

FIG. 4 depicts a high-level block diagram of a general-purpose computer suitable for use in performing the functions described herein.

To facilitate understanding, identical reference numerals have been used, where possible, to designate identical elements that are common to the figures.

DETAILED DESCRIPTION

Figure 1:
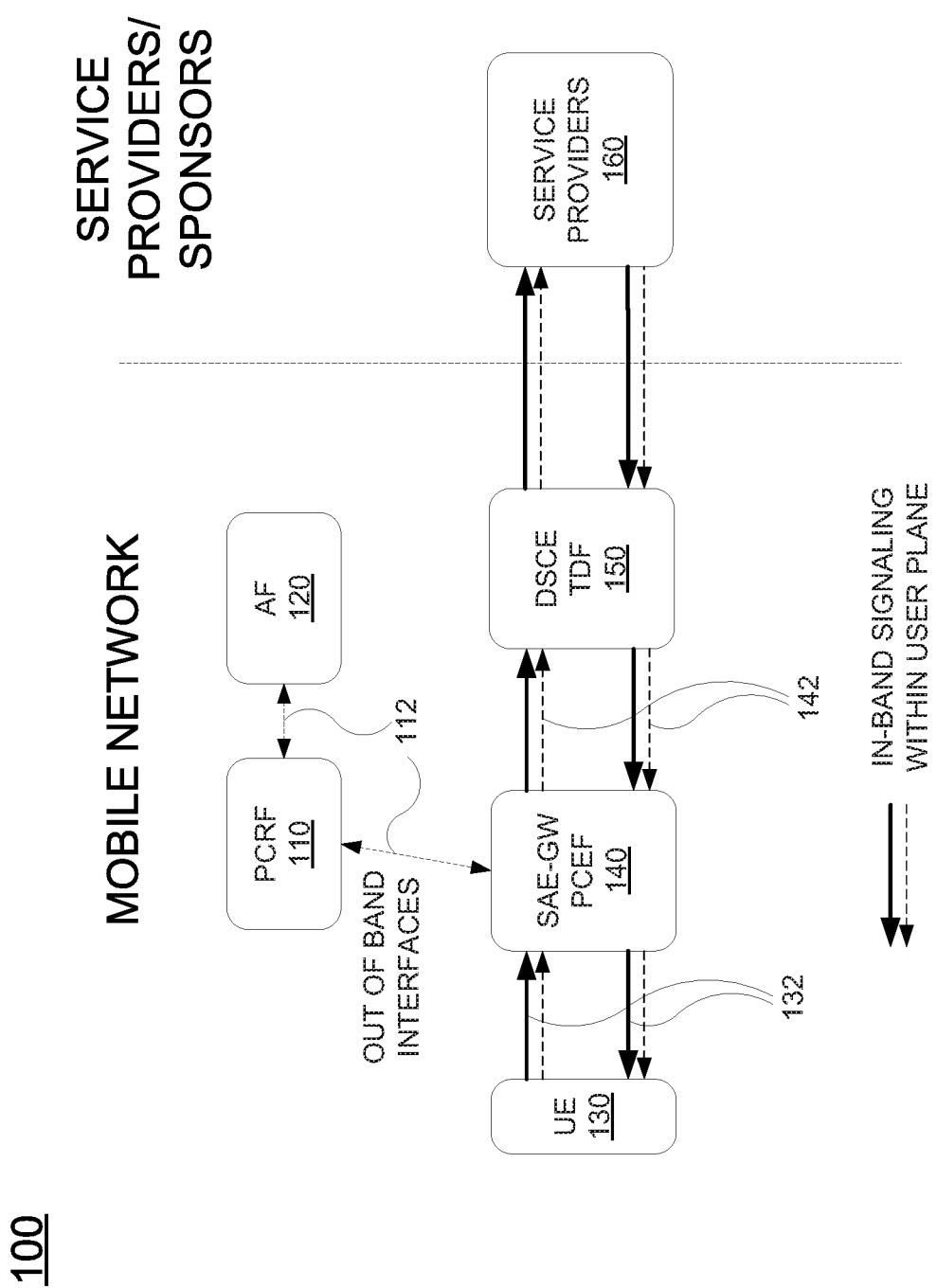
FIG. 1 illustrates a block diagram depicting an illustrative network related to the current disclosure.

The present disclosure broadly teaches a method, computer readable medium and apparatus for providing a dynamic in-band service control mechanism in a mobile network, e.g., in a 3G network, a LTE (long term evolution) wireless network and the like. Broadly, the teachings of the present disclosure can be applied to any wireless networks, e.g., 2G networks, 3G networks, 4G networks, and the like.

The present disclosure provides an in-band dynamic service control method that will enhance a mobile operator's ability to support a flexible charging model and provide a more dynamic and efficient service control including Quality of Service (QoS) over application level services such as web applications. The present method will be widely applicable to the control of mobile applications and services in general.

Web based services are dynamic and are often time sensitive. For example, web based services often involve the transmission of a short burst of information such as a small banner advertisement (ad) associated with a transaction or an in time and on location transaction. These transactional services require an effective mechanism with extremely low latency in the mobile core network. The traditional out of band signaling method will not be able to keep up with the latency requirement of these transactional services. Another associated issue is the scalability in that out of band signaling method can be limited by the resource constraints in the signaling network elements.

To illustrate, for a service sponsor use case (e.g., a provider of web-based content will sponsor or pay for the network resources that deliver the content to the end user), a service provider will send the service related information through a common Application Programming Interface (API) gateway as part of an application function (AF). The AF then converts the information into Diameter Attribute Value Pairs (AVPs) and then sends the information via standard PCC mechanism to the network to provide network resources to support the services such as bandwidth, charging, sponsor identification (id), QoS, etc. that are required to deliver the service. However, under the traditional mechanism, the signaling traffics are separated from the user plane, e.g., payload traffic. Thus, this traditional mechanism is often referred to as an out of band signaling. This process works well with IP flow based services that are not time and delay sensitive.

The present disclosure provides an in band signaling method (e.g., via hypertext transfer protocol (HTTP) header insertion) to control application level services in a dynamic fashion with very low latency. In one embodiment, the present disclosure provides a mechanism called the dynamic service control engine (DSCE) that inserts service control information in the user traffic plane (e.g., in this case the HTTP headers) and exchanges control information within the payload traffic itself. Thus, the present method is referred to as "in band signaling."

FIG. 1 is a block diagram depicting an illustrative network 100 related to the current disclosure. FIG. 1 illustrates a policy and charging rules function (PCRF) 110 and an application function (AF) 120, where an out of band signaling plane 112 is illustrated to allow the PCRF 110 to interact with the AF 120 and a system architecture evolution (SAE) gateway (GW) 140 and a dynamic service control engine (DSCE) 150.

FIG. 1 also illustrates a user endpoint (UE) 130 interacting with the SAE-GW 140 that contains a policy charging and enforcing function (PCEF). In one embodiment, the PCEF enforces the policy directives that are received from the policy and charging rules function 110. For example, the policy directives may comprise QoS directives, charging directives, gating directives and the like. These are only a few examples of the various types of policy directives. The PCEF can request the policy directives from the PCRF 110, or the policy directives can be pushed to the PCEF. This allows the policy-based admission control to be applied to the user-plane bearer 132 (broadly referred to as "user traffic plane" and shown in thicker lines). In turn, the DSCE 150 comprising a traffic detection function (TDF) will interact with the PCEF to put service control information in the user plane traffic and exchange control information within the payload traffic. Finally, the DSCE 150 will interact with one or more service providers (SPs) or sponsors 160 for supporting various mobile services and applications, e.g., a sponsored service, a 1-800 data service and the like. It should be noted that the term "service provider" 160 is intended to broadly cover the term "sponsor" in the sense that a sponsor is the service provider that will pay for the transporting of the provided contents.

As shown in FIG. 1, in one embodiment the dynamic service control engine 150 will operate with the application in the UE 130 to insert header information (e.g., application information related to the one or more mobile services) that can be processed and enforced on the TDF (traffic detection function or a HTTP proxy). An important aspect of FIG. 1 is that the in band signaling 142 (shown in thinner lines) will be in the same flow as the payload traffic (e.g., bi-directional: uplink (UL) and downlink (DL)). In other words, the in-band signaling is provided within the user-plane bearer. As illustrated in FIG. 1, it is also important to note that the out of band signaling method can still be used in conjunction with the present in band signaling method as further described below.

Figure 2:
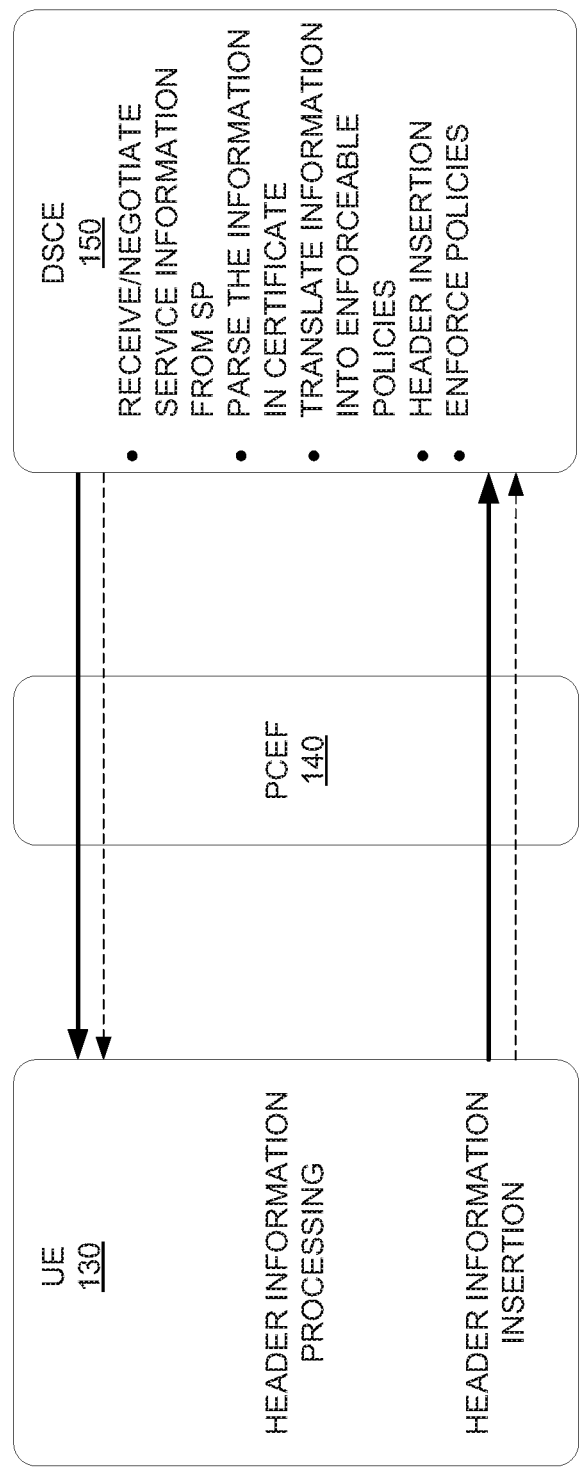
FIG. 2 illustrates how the in band signaling will operate in a high level view.

FIG. 2 illustrates how the in band signaling will operate in a high level view. Specifically, FIG. 2 shows the main functional flows of the in band signaling process, and shows the various illustrative functions performed by the DSCE. On the UE 130, there is a software application function for extracting initial service information from the packet header (s) sent at the beginning of the flow packets from the DSCE. The UE also has a software application function for inserting service information into the header, e.g., the HTTP header. In the DSCE, there are functions to extract service information from a SP's certificate (e.g., an X.509 certificate), to parse the information and to format them, if necessary, to translate the information into enforceable policies (broadly referred to as policies) for the PCEF, insert information into packet headers, and enforce policies specified in the service information. It should be noted that the term "certificate" should cover any medium in which the service information can be extracted as discussed in the present disclosure.

In one alternate embodiment, the UE 130 will not have to install any special applications to process the in band signaling or to insert headers. Instead, these functions will be performed in the PCEF 140 so that there is no impact to the UEs. The PCEF 140 will "proxy" the necessary functions for the UE 130.

In one embodiment, the DSCE 150 can be part of a HTTP proxy gateway, or in another embodiment, the DSCE 150 can be part of the TDF or the different combinations of the two. In one embodiment, the DSCE 150 is acting both as a signaling function (e.g., service information process/insertion) and enforcement function (e.g., process traffic based on the service information).

Figure 3:
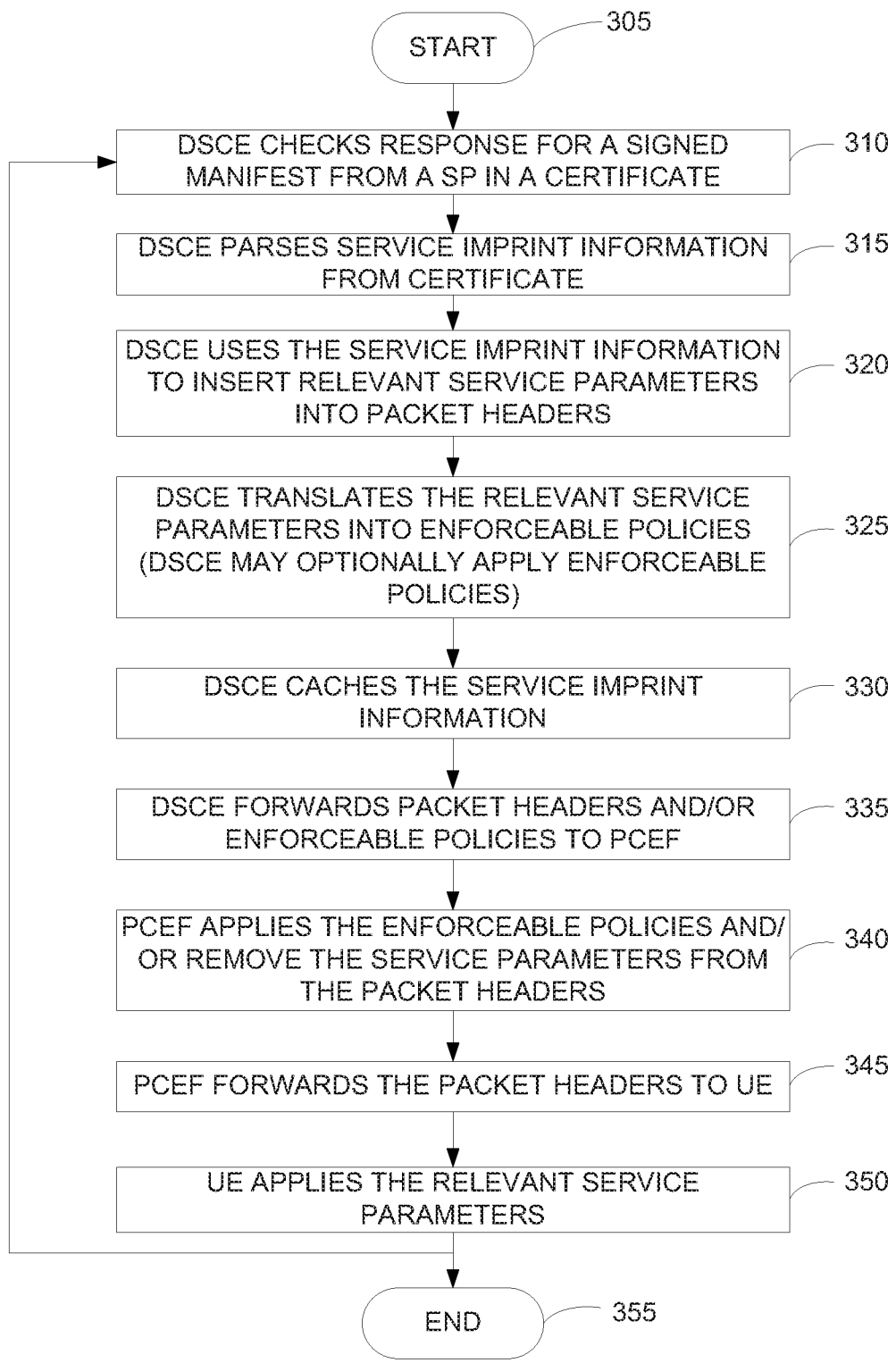
FIG. 3 illustrates a flowchart of a method for providing a dynamic in-band service control mechanism in a mobile network.

FIG. 3 illustrates a flowchart of a method 300 for providing a dynamic in-band service control mechanism in a mobile network. In one embodiment, one or more operations of method 300 may be implemented in a user endpoint device and/or a network element, e.g., an application server or policy server, as shown in FIG. 4 below. To assist the reader in understanding method 300, the operations of method 300 will be discussed in the context of a service sponsor use case (e.g., a provider of web-based content will sponsor or pay for the network resources that deliver the content to the end user in exchange for the presentation of an advertisement to the end user) and with respect to FIG. 1. It should be noted that this is only an example, and is not intended to limit the scope of the present invention. Thus, it should be noted that the present disclosure is able to support numerous other mobile services and applications.

Furthermore, although method 300 is discussed in the context of the various modules as depicted in FIG. 1, the present disclosure is not so limited. In other words, the modules of FIG. 1 can be combined into a lesser amount of modules or even expanded into additional modules based on the requirement of a particular implementation.

Method 300 starts in step 305 and proceeds to step 310. In step 310, the DSCE 150 checks for a response for a signed manifest from a SP 160 in a certificate, e.g., an X.509 certificate. X.509 is an ITU-T standard for a public key infrastructure (PKI) that employs a system of certificate authorities (CAs) for issuing certificates. A manifest can be signed with the signature becoming part of the manifest. Step 310 is performed to ensure that the manifest received from the service provider (SP) is valid before the manifest is parsed and cached by the DSCE. Thus, step 310 is broadly an authentication step for authenticating the SP and any number of methods for performing authentication of the certificate can be performed and are within the scope of the present disclosure.

In step 315, the DSCE parses service imprint information from the certificate. In one embodiment, the service imprint information comprises various service control parameters pertaining to service control information associated with a mobile service or application. For example, the various service control parameters may comprise: a sponsor type, a sponsor identification (ID), an application ID, a duration, a type of content, a time, a location, an address, an advertisement ID, authorization parameters, QoS and so on. It should be noted that the above list of service control parameters is not exhaustive. There could be numerous other service control parameters that are not listed. Again, the service control parameters are intended to be used as signaling for use in controlling or providing the mobile service or application.

Using the service sponsor use case as an example, the service parameters may define: 1) the sponsor ID, e.g., an ID representing a particular beverage company, 2) the type of content that is sponsored, e.g., a sports program, 3) an advertisement ID, e.g., the ID for the advertisement that will be played during the sports program in exchange for sponsoring the sports program to be transmitted to the subscriber, 4) a duration, e.g., the length of time for the sports program that is sponsored, the various timestamps as to when the advertisement will be displayed, 5) the location, e.g., the location of subscriber receiving the sports program (e.g., different regions may get different advertisements based on the location of the recipient of the transmitted content), 6) the application ID, e.g., the ID of the software application that will receive the sports program, 7) the QoS, e.g., whether the sports program will be transmitted in high definition mode, and so on. Again, it should be noted that the above example is only illustrative and not exhaustive. In sum, the DSCE parses the service imprint information (broadly a service signature) from a service provider that was imbedded in the X.509 certificate.

In step 320, the DSCE uses the service imprint information and inserts relevant service control parameters into one or more packet headers, e.g., the HTTP headers. It should be noted that the reference to HTTP header is only an illustrative example and the present disclosure is applicable to any other packet protocol. Thus, the signaling information is embedded into the user traffic plane.

In step 325, the DSCE may optionally translate or convert the relevant service parameters into enforcement policies that will be enforced in the TDF or the HTTP proxy gateway, e.g., PCEF 140. In other words, the DSCE may have to perform a translation operation to generate enforcement policies consistent with the relevant service control parameters, if necessary. If the HTTP proxy gateway, e.g., PCEF 140 is capable of performing this translation operation on its own, then step 330 can be deemed to be optional. It should be noted that the enforcement policies can be implemented at the TDF of the DSCE 150 and/or at the PCEF 140.

In step 330, the DSCE may optionally cache the service imprint information. Namely, the DSCE may cache the service imprint information extracted from the certificates for future transactions across the applicable user base. For example, the DSCE may apply the service imprint information to other transactions for this subscriber or a group of subscribers based on a timer (which can be set based on service level agreement (SLA) or other agreements between the various parties). In another embodiment, this feature can also be set on the DSCE. Thus, the caching of the service imprint information allows the DSCE to retain the service imprint information for a period of time so that the DSCE can continually provide mobile service to the subscriber and/or a class of users that includes the subscriber. For example, the subscriber may attempt to access certain functions on the uplink direction and the cached service imprint information will allow the DSCE to determine how to address the subscriber's service requests in accordance with the cached service imprint information.

In step 335, the DSCE forwards the modified packet headers with the embedded relevant service control parameters and any enforceable policies, if any, to the PCEF 140.

In step 340, the PCEF applies the enforceable policies and/or remove the service control parameters from the one or more packet headers. For example, the PCEF may use layer 7 deep packet inspection (DPI) and may use the information contained in the packet headers to classify the packet traffic (such as using a sponsor ID, service ID, etc.) for policy control and charging treatment. In one embodiment, the PCEF will enforce and strip the extra inserted header information from the packet headers. This will avoid any impacts to the UE 130 that may not be configured to process the extra inserted header information. Thus, in one embodiment the downlink signaling will be executed internal to the PCEF and the PCEF will process the uplink header information and enforce the uplink traffic as well as downlink traffic consistent with the relevant service parameters.

In an alternative embodiment as shown in FIG. 2, the UE 130 may have the necessary applications to address the extra inserted header information in the packet headers by itself with respect to certain service control parameters. In fact, in one embodiment, the UE 130 may actually have the capability of performing header information insertion as illustrated in FIG. 2.

In step 345, the PCEF forwards the packet headers to the UE. The packet headers may or may not contain the extra inserted header information depending on the implementation, i.e., based on the capability of the UEs that are receiving the packet headers.

In step 350, the UE may optionally apply the relevant service control parameters. For example, if the UE has the proper application to process the extra inserted header information, then it may operate in accordance with the relevant service parameters. For example, the application on the UE may operate to provide certain statistical information back to the service provider that provided the sponsored sports program as a condition of receiving the sports program without having to pay a fee. Alternatively, the application on the UE can switch to non-sponsored header based on an error response such as missing sponsored data information and the like.

However, in one embodiment step 350 is deemed to be optional since the UE may not be loaded with any special application. If that is the case, the PCEF would have stripped the extra inserted header information from the packet headers before the packet headers are sent to the UE. This alternative embodiment would therefore allow existing UEs to continue to operate in the current state without the need for loading any special application, while enjoying the benefit of the present dynamic in band service control mechanism.

Method 300 then ends in step 355. Alternatively, the method 300 may return to step 310.

It should be noted that although not specifically specified, one or more steps or operations of method 300 may include a storing, displaying and/or outputting step as required for a particular application. In other words, any data, records, fields, and/or intermediate results discussed in each of the respective methods can be stored, displayed and/or outputted to another device as required for a particular application. Furthermore, steps, blocks, or operations in FIG. 3 that recite a determining operation or involve a decision do not necessarily require that both branches of the determining operation be practiced. In other words, one of the branches of the determining operation can be deemed as an optional step.

FIG. 4 depicts a high-level block diagram of a general-purpose computer, application server or endpoint computing device suitable for use in performing the functions or operations as described herein. As depicted in FIG. 4, the system 400 comprises a hardware processor element 402 (e.g., a CPU), a memory 404, e.g., random access memory (RAM) and/or read only memory (ROM), a module 405 for providing dynamic in band service control mechanism in a wireless network, and various input/output devices 406 (e.g., storage devices, including but not limited to, a tape drive, a floppy drive, a hard disk drive or a compact disk drive, a receiver, a transmitter, a scanner (e.g., a barcode scanner), a Near Field Communication (NFC) interface, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents, e.g., computer readable instructions pertaining to the method(s) discussed above can be used to configure a hardware processor to perform operations of the above disclosed methods. For example, a computer-readable medium may be in communication with the processor, where the computer-readable medium having stored thereon a plurality of instructions which, when executed by the hardware processor, cause the hardware processor to perform the operations (e.g., method 300) as disclosed above. It should be noted that the processor can be configured or programmed to cause other devices to perform one or more operations as discussed above. In other words, the processor may serve the function of a central controller directing other devices to perform the one or more operations as discussed above. Furthermore, the operations as disclosed in the above method 300 can be implemented in a plurality of different hardware elements, e.g., the UE, PCEF, and DSCE can all be deployed in separate hardware systems that are distinct from each other.

In one embodiment, the present module or process 405 for providing dynamic in band service control mechanism in a wireless network can be implemented as computer-executable instructions (e.g., a software program comprising computer-executable instructions) and loaded into memory 404 and executed by the hardware processor 402 to implement the steps, functions or operations as discussed above. As such, the present method 405 for providing dynamic in band service control mechanism in a wireless network (including associated data structures) of the present disclosure can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a packet header within a user-plane bearer, the method comprising:
receiving, by a processor of a user endpoint device, the packet header within the user-plane bearer from a policy charging and enforcing function, the packet header comprising a service control parameter, wherein the service control parameter is intended to be used as an in-band signaling in controlling a mobile service, and wherein the user endpoint device includes a software application function for extracting service information from the packet header; and
applying, via the processor, the service control parameter derived from the packet header.

2. The method of claim 1, wherein the policy charging and enforcing function is deployed by a gateway of a wireless communication network.

3. The method of claim 2, wherein the gateway comprises a traffic detection function gateway.

4. The method of claim 2, wherein the gateway comprises a hypertext transfer protocol proxy gateway.

5. The method of claim 1, wherein the packet header comprises a hypertext transfer protocol header.

6. The method of claim 1, further comprising:
storing, via the processor, the service control parameter.

7. The method of claim 1, wherein the service control parameter is further intended to be used as an in-band signaling in controlling a mobile application.

8. A tangible computer-readable medium storing a plurality of instructions which, when executed by a processor of a user endpoint device, cause the processor to perform operations for processing a packet header within a user-plane bearer, the operations comprising:
receiving the packet header within the user-plane bearer from a policy charging and enforcing function, the packet header comprising a service control parameter, wherein the service control parameter is intended to be used as an in-band signaling in controlling a mobile service, and wherein the user endpoint device includes a software application function for extracting service information from the packet header; and
applying the service control parameter derived from the packet header.

9. The tangible computer-readable medium of claim 8, wherein the policy charging and enforcing function is deployed by a gateway of a wireless communication network.

10. The tangible computer-readable medium of claim 9, wherein the gateway comprises a traffic detection function gateway.

11. The tangible computer-readable medium of claim 9, wherein the gateway comprises a hypertext transfer protocol proxy gateway.

12. The tangible computer-readable medium of claim 8, wherein the packet header comprises a hypertext transfer protocol header.

13. The tangible computer-readable medium of claim 8, the operations further comprising:
storing the service control parameter.

14. The tangible computer-readable medium of claim 8, wherein the service control parameter is further intended to be used as an in-band signaling in controlling a mobile application.

15. A user endpoint device for processing a packet header within a user-plane bearer, the user endpoint device comprising:
a processor; and
a tangible computer-readable medium storing a plurality of instructions which, when executed by the processor, cause the processor to perform operations, the operations comprising:
receiving the packet header within the user-plane bearer from a policy charging and enforcing function, the packet header comprising a service control parameter, wherein the service control parameter is intended to be used as an in-band signaling in controlling a mobile service, and wherein the user endpoint device includes a software application function for extracting service information from the packet header; and
applying the service control parameter derived from the packet header.

16. The user endpoint device of claim 15, wherein the policy charging and enforcing function is deployed by a gateway of a wireless communication network.

17. The user endpoint device of claim 16, wherein the gateway comprises a traffic detection function gateway or a hypertext transfer protocol proxy gateway.

18. The user endpoint device of claim 15, wherein the packet header comprises a hypertext transfer protocol header.

19. The user endpoint device of claim 15, the operations further comprising:

storing the service control parameter.

20. The user endpoint device of claim 15, wherein the service control parameter is further intended to be used as an in-band signaling in controlling a mobile application.

\* \* \* \* \*